United States Patent
Haase et al.

(10) Patent No.: US 12,049,954 B2
(45) Date of Patent: Jul. 30, 2024

(54) PLANET CARRIER RING SUN GEAR ASSEMBLY FOR A TRANSMISSION DEVICE OF A WHEEL HUB DRIVE COMPRISING AT LEAST TWO PLANETARY GEARS, WHEEL HUB DRIVE HAVING SUCH A PLANET CARRIER RING SUN GEAR ASSEMBLY AND A VEHICLE OPERATED BY WHEEL HUB DRIVE AND MUSCLE POWER

(71) Applicant: Mahle International GmbH, Stuttgart (DE)

(72) Inventors: Robin Haase, Reinhardtsdorf (DE); Matthias Koop, Neufahrn (DE); Jan Pruegner, Dresden (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 18/104,784

(22) Filed: Feb. 1, 2023

(65) Prior Publication Data
US 2023/0242214 A1    Aug. 3, 2023

(30) Foreign Application Priority Data
Feb. 2, 2022  (DE) ..................... 10 2022 201 079.5

(51) Int. Cl.
*F16H 57/08*  (2006.01)
*B62M 6/65*  (2010.01)
(Continued)

(52) U.S. Cl.
CPC ........... *F16H 57/082* (2013.01); *B62M 11/16* (2013.01); *B62M 11/18* (2013.01); *B62M 6/65* (2013.01);
(Continued)

(58) Field of Classification Search
CPC ............ F16H 57/082; F16H 2057/085; B62M 6/40–45; B62M 6/60–65; B62M 11/14–18; B62M 25/08
See application file for complete search history.

(56) References Cited

U.S. PATENT DOCUMENTS

| | | | |
|---|---|---|---|
| 6,276,475 B1 * | 8/2001 | Nakanosono | B62M 11/16 |
| | | | 310/67 R |
| 9,068,646 B2 | 6/2015 | Hagedorn | |
| (Continued) | | | |

FOREIGN PATENT DOCUMENTS

| | | | |
|---|---|---|---|
| CN | 2322888 Y | | 6/1999 |
| CN | 211606313 U | * | 9/2020 |
| (Continued) | | | |

OTHER PUBLICATIONS

English abstract for CN-2322888.
(Continued)

*Primary Examiner* — Ernesto A Suarez
*Assistant Examiner* — James J Taylor, II
(74) *Attorney, Agent, or Firm* — Fishman Stewart PLLC

(57) ABSTRACT

A planet carrier ring sun gear assembly for a transmission device with at least two planetary gears of a wheel hub drive for a vehicle is described. The planet carrier ring sun gear assembly may include a planet carrier ring of a first planetary gear. The planet carrier ring may be configured to support a plurality of planet gear wheels of the first planetary gear and a sun gear of a second planetary gear. The planet carrier ring and the sun gear may form a monolithic unit.

19 Claims, 10 Drawing Sheets

(51) Int. Cl.
*B62M 11/16* (2006.01)
*B62M 11/18* (2006.01)
*F16H 57/02* (2012.01)

(52) U.S. Cl.
CPC .............. *F16H 2057/02034* (2013.01); *F16H 2057/085* (2013.01)

(56) References Cited

U.S. PATENT DOCUMENTS

| | | | |
|---|---|---|---|
| 9,670,989 B2 * | 6/2017 | Hagedorn | ............ F16H 57/0018 |
| 2012/0299416 A1 * | 11/2012 | Chen | ....................... H02K 7/116 |
| | | | 310/83 |
| 2015/0133253 A1 | 5/2015 | Huang | |
| 2017/0219066 A1 * | 8/2017 | Yamamoto | ............... B62M 6/55 |
| 2018/0172113 A1 * | 6/2018 | Li | ............................ F16H 1/46 |
| 2022/0204132 A1 * | 6/2022 | Huang | ................. B60K 7/0007 |

FOREIGN PATENT DOCUMENTS

| | | | | |
|---|---|---|---|---|
| DE | 102020104183 A1 | | 8/2021 | |
| EP | 2860336 A2 | | 4/2015 | |
| FR | 2878908 A1 | * | 6/2006 | ............ F02N 15/08 |
| JP | 2019113087 A | | 7/2019 | |

OTHER PUBLICATIONS

English abstract for JP-2019113087.
English abstract for DE-102020104183.
German Search Report for DE-102022201079.5, dated Oct. 10, 2022.

* cited by examiner

PLANET CARRIER RING SUN GEAR ASSEMBLY FOR A TRANSMISSION DEVICE OF A WHEEL HUB DRIVE COMPRISING AT LEAST TWO PLANETARY GEARS, WHEEL HUB DRIVE HAVING SUCH A PLANET CARRIER RING SUN GEAR ASSEMBLY AND A VEHICLE OPERATED BY WHEEL HUB DRIVE AND MUSCLE POWER

CROSS-REFERENCE TO RELATED APPLICATIONS

This application claims priority to German Patent Application No. DE 10 2022 201 079.5, filed on Feb. 2, 2022, the contents of which is hereby incorporated by reference in its entirety.

TECHNICAL FIELD

The invention relates to a planet carrier ring sun gear assembly for a transmission device of a wheel hub drive comprising at least two planetary gears. The invention in particular also relates to a wheel hub drive having such a planet carrier ring sun gear assembly and further in particular a vehicle operated by wheel hub drive and muscle power.

BACKGROUND

A planet carrier ring sun gear assembly of this type is known from a wheel hub drive for an electric bicycle described in CN 2322888Y. The wheel hub drive has a housing, a motor, a step-down transmission and a ratchet wheel, wherein end covers of the motor, a stator seat, an end cover of a drive device, a toothed ring of the step-down transmission, a main drive shaft of the rotor seat and a main drive shaft of the step-down transmission are each embodied integrally. Disadvantageous in this is that the wheel hub drive is a relatively large construction axially with respect to the main drive shaft.

SUMMARY

The object of the invention therefore is to provide an improved or at least another embodiment of a planet carrier ring sun gear assembly. In particular, a wheel hub drive having such a planet carrier ring sun gear assembly and further, in particular a vehicle operated by wheel hub drive and muscle power is to be proposed.

In the present invention, this object is solved in particular through the subject matter of the independent claim(s). Advantageous embodiments are the subject matter of the dependent claim(s) and of the description.

The basic idea of the invention consists in providing a planet carrier ring sun gear assembly for a wheel hub drive which has been optimised by measures of the function integration in terms of weight, number of parts, installation space and production costs.

Accordingly it is provided that the planet carrier ring sun gear assembly comprises for a transmission device of a wheel hub drive for a vehicle, in particular an electric bicycle, comprising at least or exactly two planetary gears, a planet carrier ring of the planetary gear equipped for supporting planet gear wheels of a first planetary gear, which could also be referred to as webring, and a sun gear of a second planetary gear. It is substantial that the said planet carrier ring and the said sun gear form a monolithic unit. In other words, the planet carrier ring of the first planetary gear supporting the planet gear wheels of the first planetary gear and the sun gear of the second planetary gear are embodied integrally, for example produced in one casting out of a single material or further for example positively joined integrally out of two separate components. Because of this, a relatively compact and durable planet carrier ring sun gear assembly is realised, which can be advantageously used in a wheel hub drive.

Practically it can be provided that the said planet carrier ring is formed by a single-flange or single-walled basic ring disc body defining a planet carrier ring centre axis. It can also be provided that the said sun gear, with respect to the planet carrier ring centre axis, is oriented coaxially, is arranged on the front side of a large annular surface of the basic ring disc body referred to in the following as sun gear mounting surface and integrally connected to the same. A preferred embodiment for the planet carrier ring sun gear assembly is thereby stated which can be provided cost-effectively and in large quantities.

Further practically, it can be provided that on the said planet carrier ring located opposite to the said sun gear, axial bearing arms for axially supporting the planet carrier ring sun gear assembly are arranged on a stator ring of an electric motor device of the wheel hub drive. The said axial bearing arms can be practically arranged on a large annular surface referred to as planet carrier ring mounting surface in the following of a single-flange or single-walled basic ring disc body of the said planet carrier ring and can be formed integrally with the basic ring disc body. Because of this, an axial support of the planet carrier ring sun gear assembly on the stator ring of the electric motor device can be realised with simple means. Practically, the axial bearing arms support themselves on a stator carrier of a stator ring of an electric motor device embodied in multiple parts if applicable or are mounted thereon. Through the realisable or realised axial support, an internal gear of a transmission device can be equipped for example with an internal helical toothing, wherein the axial forces caused by the internal helical toothing of the internal gear can be axially supported or are axially supported on the stator ring of the electric motor device by way of the said axial bearing arms. Because of this, the use of an internal gear equipped with internal helical toothing and thus a relatively low-noise operation of the wheel hub drive, which for example increases the driving comfort for a user of the said vehicle, is possible.

Practically it can be provided that the planet carrier ring sun gear assembly comprises exactly three axial bearing arms which are arranged on the planet carrier mounting surface, evenly distributed round about a planet carrier ring centre axis defined by the said basic ring disc body are located evenly distributed on a circular path. In the assembled state of the wheel hub drive, the three axial bearing arms of the planet carrier ring sun gear assembly are practically touchingly supported axially and/or radially on the stator ring of the electric motor device, in particular on a stator carrier of the stator ring, as a result of which a relatively efficient and compact mounting of the planet carrier ring sun gear assembly on the stator ring of the electric motor device can be realised. In particular, the axial bearing arms can be supported via a practically joined rolling bearing arrangement on the stator ring, or the stator carrier of the stator ring of the electric motor device.

Further practically it can be provided that the axial bearing arms stand perpendicularly on the said planet carrier ring or the said planet carrier mounting surface. The axial bearing arms can practically be formed by annular segment bodies, which with their concave sides are oriented in the direction of the planet carrier ring centre axis. Because of this, relatively durable axial bearing arms that can be produced cost-effectively are stated.

Practically it can be provided that on the said planet carrier ring located opposite the said sun gear, support pins for supporting the planet gear wheels of the first planetary gear are arranged. The support pins can be arranged on a large annular surface of a single-flange or single-walled basic ring disc body of the planet carrier ring in the following referred to as planet carrier mounting surface and embodied integrally with the basic ring disc body. On the said support pins, planet gear wheels each equipped with a centric planet gear rolling bearing are practically arranged. The respective outer rings of these planet gear rolling bearings are practically attached to the respective planet gear wheel in a non-rotatable manner. The respective inner rings of these planet gear rolling bearings are practically arranged on the said support pins, for example by hot-staking, so that they are captively secured thereon without further fixing means.

Further practically it can be provided that the planet carrier ring sun gear assembly has exactly three support pins, which are arranged on the planet carrier mounting surface located evenly distributed on a circular path about the planet carrier ring centre axis. Preferably, the said axial bearing arms can each be arranged in the circumferential direction round about the planet carrier ring centre axis between two adjacent support pins in the manner that support pins and axial bearing arms follow one another alternatingly in the circumferential direction. By way of this, a preferred embodiment for a planet carrier ring sun gear assembly having support pins and/or axial bearing arms is stated, which can be produced to be relatively durable and cost-effective.

Practically it can be provided that in a circumferential direction round about a planet carrier ring centre axis defined by a basic ring disc body of the planet carrier ring, adjacent axial bearing arms between them define an angle of at least 45° and/or an angle of maximally 180° and/or an angle of exactly 120°. It can also be provided that in a circumferential direction round about a planet carrier ring centre axis defined by a basic ring disc body of the planet carrier ring, adjacent support pins between them define an angle of at least 45° and/or an angle of maximally 180° and/or an angle of exactly 120°. Thus, preferred arrangements of the axial bearing arms and/or of the support pins on the basic ring disc body are stated. It can also be provided that the support pins viewed in the said circumferential directions are each arranged in the middle between two adjacent axial bearing arms or vice versa. For example, the axial bearing arms and support pins, when exactly three axial bearing arms and exactly three support pins are provided, can be arranged in an alternating sequence and/or each be angularly offset from one another by 60°.

Further practically it can be provided that the said planet carrier ring sun gear assembly altogether is produced out of a plastic material or a composite material. Alternatively it can also be provided that the axial bearing arms are produced out of a plastic material or a composite material and/or the basic ring disc body out of a plastic material or a composite material and/or the support pins out of a plastic material or a composite material and/or the sun gear out of a plastic material or a composite material. Because of this, the planet carrier ring sun gear assembly is comparatively light in weight and can be produced cost-effectively. For example, it can be produced in relatively large quantities as part of a plastic injection moulding method.

Another basic idea of the invention, which can be realised additionally or alternatively to the basic idea named further up can consist in stating a wheel hub drive of a vehicle, in particular of an electric bicycle. The same has a hub housing composed of a pot-shaped monolithic housing pot and a monolithic housing cover, which hub housing is mounted on a central hollow shaft of the wheel hub drive arranged coaxially with respect to a centre axis of the wheel hub drive so as to be rotatably adjustable, a drive unit of an electrically operated electric motor device housed in the hub housing for providing a motor torque, a transmission device housed in the hub housing for translating the motor torque into a net torque and a coupling device housed in the hub housing for transmitting the net torque to the housing cover. In order to be able to build the said wheel hub drive so as to be relatively compact, to be realised light in weight and produced relatively cost-effectively, it is practical when the transmission device of the drive unit has at least one planet carrier ring sun gear assembly according the preceding description.

The transmission device is practically equipped to translate a provided motor torque into a net torque, it operating with a single, pre-set or pre-settable transmission ratio.

Practically it can be provided that the electric motor device, the transmission device and the coupling device are arranged coaxially with respect to the centre axis. Further it can be provided that the electric motor device, the transmission device and the coupling device are arranged axially with respect to the centre axis axially with respect to the centre axis in series. Because of the proposed arrangement, the wheel hub drive can be realised so as to be relatively compact.

Another basic idea of the invention, which can be realised additionally or alternatively to the basic idea mentioned further up, can consist in stating a vehicle operated by wheel hub drive and muscle power, in particular an electric vehicle, which has at least one wheel hub drive installed in the region of a wheel hub of a wheel of the vehicle according to the preceding description and a muscle power-operated pedal device interacting with wheel hub drive via a transmission gear, in particular a chain drive. By way of this, a vehicle, in particular an electric bicycle having a wheel hub drive and a pedal device is stated, wherein the said wheel of the vehicle, in particular because of the improvements of the wheel hub drive discussed above is an axially relatively compact construction and light in weight.

In summary it remains to note: the present invention practically relates to a planet carrier ring sun gear assembly for a transmission device of a wheel hub drive comprising at least two planetary gears for a vehicle, in particular an electric bicycle. It is substantial in particular for the invention that a planet carrier ring of a first planetary gear for supporting planetary gear wheels of the first planetary gear and a sun gear of a second planetary gear are embodied integrally, so that they form a monolithic unit. The invention relates in particular to a wheel hub drive for a vehicle, which comprises at least one such planet carrier ring sun gear assembly. The invention, further, relates to in particular a vehicle, in particular an electric bicycle, which has such a wheel hub drive.

Further important features and advantages of the invention are obtained from the subclaims, from the drawings and from the associated figure description by way of the drawings.

It is to be understood that the features mentioned above and still to be explained in the following cannot only be used in the respective combination but also in other combinations or by themselves without leaving the scope of the present invention.

Preferred embodiments of the invention are shown in the drawings and are explained in more detail in the following description, wherein same reference numbers relate to same or similar or functionally same components.

BRIEF DESCRIPTION OF THE DRAWINGS

It shows, in each case schematically

DETAILED DESCRIPTION

Figure 1:
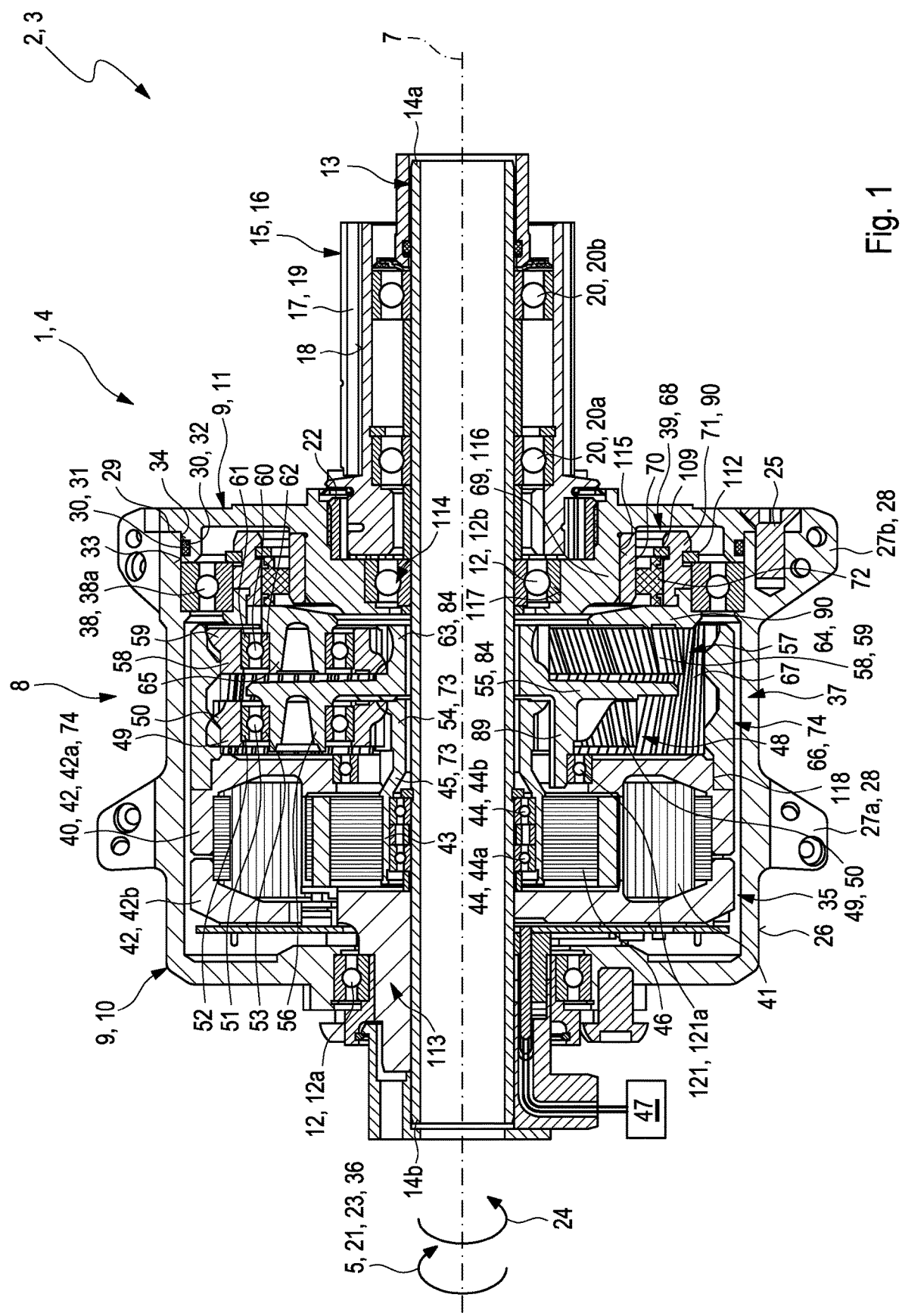
FIG. 1 shows a longitudinal section of a wheel hub drive 1 according to a first embodiment.

FIGS. 1 to 17 showing preferred embodiments of a wheel hub drive which altogether is designated by the reference number 1 for a vehicle exemplarily realised by an electric bicycle 3, which wheel hub drive 1 is installed for example in the region of a wheel hub 4 of a wheel 2 of the electric bicycle or forms the same and practically can transmit a drive torque 5 to the wheel 2.

FIG. 1 illustrates a longitudinal section through the said wheel hub drive 1 according to a first embodiment, wherein except for rolling bodies of rolling bearings that are not designated in more detail all components are cut open along a centre axis 7 drawn in dash-dotted line, so that on the one hand internal torque paths and the structural configuration of the components of the wheel hub drive 1 located inside, which are explained in detail in the following, are visible.

The wheel hub drive 1 comprises a multi-part hub housing 9 consisting of a pot-shaped monolithic housing pot 10 and a monolithic housing cover 11 housing a drive unit 8. The hub housing 9 is rotatably adjustably mounted round about the centre axis 7 via a first rolling bearing arrangement 12 consisting of two separate rolling bearings 12a, 12b, in particular two commercially available simple ball rolling bearings, in a fixed-floating bearing arrangement directly or indirectly on a central hollow shaft 13 of the wheel hub drive 1 arranged coaxially with respect to the centre axis 7, which can be realised for example by an aluminium or steel hollow shaft. Here, the central hollow shaft 13 penetrates the housing pot 10 and the housing cover 11 of the hub housing 9 centrically in each case, practically in the region of a housing pot central opening 113 of the housing pot 10 and a housing cover central opening 114 of the housing cover provided for this purpose, as a result of which the central hollow shaft 13 protrudes over the hub housing 9 on both sides axially with respect to the centre axis 7 with free axial ends 14a, 14b. The one free axial end 14a can be configured with respect to the centre axis 7 longer than or as long as the other free axial end 14b. The central hollow shaft 13, furthermore, is exemplarily fixed in the region of its two free axial ends 14a, 14b, to a frame of the electric bicycle 3 which is not illustrated.

In FIG. 1 it is noticeable, furthermore, that the housing cover 11, forming an annular contact region 29 rotating about the centre axis 7, is supported on the housing pot 10. Practically, a seal arrangement 30 is provided in the contact region 29 between the housing cover 11 and the housing pot 10 having a circumferential groove 31 introduced into the housing cover 11 and/or housing pot 10 including a sealing element 32 arranged therein, so that the housing cover 11, here, is arranged on the housing pot 10 in a fluid-tight manner. Practically, the seal arrangement 30 is designed as radial seal and for this purpose arranged between an annular housing cover radial bearing surface 33 oriented with respect to the centre axis 7 radially to the outside and a likewise annular housing bottom radial bearing surface 34 which in this regard is located radially opposite and with respect to the centre axis 7 is oriented radially to the inside. Further sealing concepts can likewise be provided, for example an axial seal arranged in the contact region 29. Because of this, the drive unit 8 mentioned at the introduction can be housed by the hub housing 9 in a fluid-tight, in particular hermetically sealed manner, as a result of which for the wheel hub drive 1 proposed according to the invention, a certain water tightness can be provided, as a result of which the wheel hub drive 1 can also be used in bad weather situations without problem.

Furthermore, the wheel hub drive 1 has a profile hollow shaft 15, which is exemplarily realised by a splined hollow shaft 16 with spline profile 17, which has spline profile drivers 19 arranged with respect to the centre axis 7 on the profile hollow shaft circumference lateral surface 18 arranged radially outside, for producing a positive shaft-hub connection, in particular with a commercially available sprocket set. Alternatively, the profile hollow shaft 15 can likewise be realised by a toothed hollow shaft that is not illustrated, which can also be referred to as pinion hollow shaft, with a straight or helical tooth shaft profile having teeth arranged on its circumference lateral surface which are arranged with respect to the centre axis 7 radially outside for producing a positive shaft-hub connection. In FIG. 1 it is visible, furthermore, that the profile hollow shaft 15 is rotatably adjustably mounted about the centre axis 7 via a second rolling bearing arrangement 20 consisting of two separate rolling bearings 20a, 20b, in particular two commercially available simple ball rolling bearings, in a fixed-floating bearing arrangement on the central hollow shaft 13, in particular in the region of its free axial ends 14a, 14b or on the same. Accordingly it is possible that a commercially available sprocket set which is not illustrated here for the electric bicycle 3 consisting of sprocket wheels of different diameters can be mounted on the profile hollow shaft 15 with a profiling that is complementary with respect to the said spline profile 17 or tooth shaft profile can be mounted to the profile hollow shaft 15 in order to thereby be able to transmit a pedal torque 21 provided by muscle power on a pedal device which is not illustrated via a pedal-operated transmission gear, in particular a chain drive which is not illustrated here, to the profile hollow shaft 15.

In FIG. 1 it is noticeable, furthermore, that the profile hollow shaft 15 at one end supports itself in the region of the housing cover 11 via a freewheel 21 which is not further discussed with respect to its constructional configuration, in particular a commercially available pawl freewheel screwed into the housing cover 11, on the said housing cover 11, as a result of which the pedal torque 21 provided at the profile hollow shaft 15 can be transmitted in a circumferential direction 23 rotating about the centre axis 7 from the profile hollow shaft 15 to the housing cover 11 since the freewheel 22 then non-rotatably jams the profile hollow shaft 15 to the housing cover 11, but in an opposite circumferential direction 24 oriented opposite regarding the circumferential direction 23, no moments can be transmitted since the freewheel 22 then slips through in a low-friction manner and enables a relative rotary movement between the profile hollow shaft 15 and the housing cover 11. The pedal torque 21 transmitted to the housing cover 11 with a corresponding rotary adjustment of the profile hollow shaft 15 is transmitted from the housing cover 11 to the housing pot 10, for the purpose of which the housing cover 11 can be non-rotatably fixed to the housing pot 10 by means of fastening screws 25. Finally, the pedal torque 21 is provided on the wheel 2 via two separate spoke mounting rims 27a, 27b. The spoke mounting rims 27a, 27b are exemplarily configured coaxially circumferential with respect to the centre axis 7 and axially spaced apart from one another with respect to the centre axis 7 and formed by radial projections 28 integrally moulded onto an outer circumferential surface 26 of the housing pot 10 for fastening individual spokes of the wheel 2.

Making further reference to FIG. 1 it has to be explained that the drive unit 8 comprises an electrically operable electric motor device 35 for providing a motor torque 36, a transmission device 37 for translating the provided motor torque 36 into a net torque and a coupling device 39 for transmitting the net torque to the housing cover 11. Because of this, the motor torque 36 provided by the electric motor device 35 can be transmitted according to a pre-set transmission ratio to the housing cover 11 in a modified manner and, analogously to the pedal torque 21 explained above, be transmitted from the housing cover 11 to the housing pot 10, where it is finally provided as drive torque 5 on the wheel 2 via the two spoke fastening rims 27a, 27b. The electric motor device 35, the transmission device 37 and the coupling device 39 are practically arranged coaxially with respect to the centre axis 7 and/or axially in series with respect to the centre axis 7.

The electric motor device 35 according to FIG. 1 has a stator ring 40 which completely encloses the central hollow shaft 13 in the circumferential direction 23 and is in particular configured in multiple parts, which with respect to the centre axis 7 is located radially outside and a rotor ring 43 which with respect to the stator ring 40 is located radially inside and likewise encloses the central hollow shaft 13 in the circumferential direction 23, which rotor ring 43 with respect to the stator ring 40 and the central hollow shaft 13 is rotatably adjustable about the centre axis 7. The rotor ring 43 exemplarily comprises a drive hollow shaft 45 which is rotatably adjustably mounted on the central hollow shaft 13 via a third rolling bearing arrangement 44 consisting of two separate rolling bearings 44a, 44b, in particular two commercially available simple ball rolling bearings, which completely encloses the central hollow shaft 13 likewise in the circumferential direction 23. On the drive hollow shaft 45 a laminated core 46 of the rotor ring 43 with electrically shorted short-circuit bars is non-rotatably mounted. The stator ring 40 exemplarily comprises a stator 41 and a stator carrier 42 which is non-rotatably arranged on the central hollow shaft 13 and receives the stator 41. The stator carrier 42 can practically be configured in multiple parts and/or be divided into a stator carrier pot 42a and a stator carrier cover 42b and/or be realised by a metallic stator carrier, in particular an aluminium or steel stator carrier. The electric motor device 35 can be supplied with electric energy by means of an electric connection cable 47 which is only indicated symbolically.

In FIG. 1 it is evident, furthermore, that the said transmission device 37, with respect to the centre axis 7, is directly arranged axially adjacent to the electric motor device 35 and formed by two separate planetary gears 48, 57, which with respect to the centre axis 7 are arranged in series. Because of this, the one planetary gear 48 of these two planetary gears 48, 57 directly face the electric motor device 35 and is therefore referred to as first planetary gear 48 in the following, while the other planetary gear 57 of these two planetary gears 48, 57 is referred to as second planetary gear 57. Both, the first planetary gear 48 and also the second planetary gear 57, exemplarily each comprises three or more planet gear wheels 49, 58, which orbit in a common internal gear 66 of the transmission device 37, which with respect to the centre axis 7 axially engages over the two planetary gears 48, 57 completely and is located radially outside with respect to the centre axis 7, wherein they each mesh with their outer toothings 50, 59 with an internal toothing 67 of the internal gear 66, in particular an internal helical toothing. The internal gear 66 is thus a hollow-cylindrical internal gear which is jointly utilised by the planetary gears 48, 57 of the transmission device 37. The internal gear 66 can be preferably produced out of an injection-mouldable plastic material or an injection-mouldable composite material.

Figure 3:
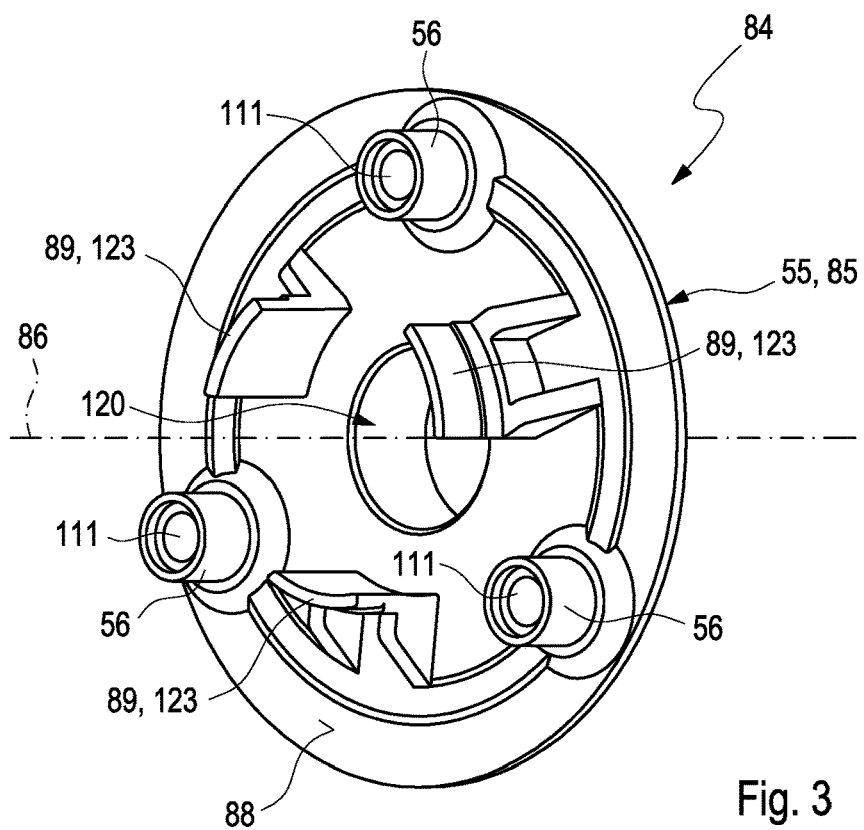
FIG. 3 shows, in a perspective view, the planet carrier ring sun gear assembly from FIGS. 1 and 2.

The three or more planet gear wheels 49 of the first planetary gear 48 mesh with their external toothings 50, furthermore, with a sun gear 54 of the first planetary gear 48 which is located centrically with respect to the centre axis 7 and radially inside with respect to these three or more planet gear wheels 49. This sun gear 54 is mechanically assigned to the drive hollow shaft 45 of the electric motor device 35 so that this sun gear 54 and the drive hollow shaft 45 interact in a torque-transmitting manner. The three or more planet gear wheels 49 of the first planetary gear 48 are each equipped with a centric planet gear rolling bearing 51, wherein the respective outer rings 52 of these planet gear rolling bearings 51 are non-rotatably attached to the respective planet gear wheel 49 and the respective inner rings 53 of these planet gear rolling bearings 51 are arranged on support pins 56 of a planet carrier ring 55 of the first planetary gear 48 equipped for supporting and guiding planet gear wheels. The inner rings 53 of these planet gear rolling bearings 51 are exemplarily connected to the respective support pins 56 of the planet carrier ring 55 by hot-staking, so that they are captively secured thereon. In FIG. 3 it is also visible that each support pin 56, for saving material and weight, can comprise a cup-like axial recess 111.

The three or more planet gear wheels 58 of the second planetary gear 57 mesh with their respective outer toothings 59, furthermore, with a sun gear 63 located radially inside arranged centrically with respect to the centre axis 7 and these three or more planet gear wheels 58. The three or more planet gear wheels 58 of the second planetary gear 57 are each likewise equipped with a centrically arranged planet gear rolling bearing 60, analogously to the first planetary gear 48. The respective outer rings 61 of these planet gear rolling bearings 60 are non-rotatably attached to the respective planet gear wheel 58 and the respective inner rings 62 are arranged on support pins 65 of a planet carrier ring 64 of the second planetary gear 57 equipped for supporting and guiding planet gear wheels. These inner rings 62 are also exemplarily secured to the respective support pins 65 by hot-staking, so that they cannot inadvertently come loose. The planet carrier ring 64 of the second planetary gear 57 can be practically supported on the housing pot 10 via a fourth rolling bearing arrangement 38, in particular a ball rolling bearing 38, with respect to the centre axis 7 from radially inside. The sun gear 63 of the second planetary gear 57 is mechanically assigned to the planet carrier ring 55 of the first planetary gear 48 so that the planet carrier ring 55 of the first planetary gear 48 and the sun gear 63 of the second planetary gear 57 can interact in a torque-transmitting manner. The two planetary gears 48, 57 are practically arranged coaxially with respect to the centre axis 7 and/or axially in series with respect to the centre axis 7.

In FIG. 1 it is evident, furthermore, that here the said coupling device 39 for transmitting the net torque from the transmission device 37 to the housing cover 11 is realised by a freewheel device 68, as a result of which the net torque provided by the drive unit 8 can be transmitted to the housing cover 11 dependent on the direction of rotation. This means concretely that the net torque provided by the transmission device 37 on the freewheel device 68 on the output side can be transmitted in the circumferential direction 23 rotating about the centre axis 7 from the freewheel device 68 to the housing cover 11 since the freewheel device 68 then non-rotatably jams the transmission device 37 with the housing cover 11, but that no moments can be transmitted in the counter-circumferential direction 24 oriented opposite to the circumferential direction 23, since the freewheel device 68 then practically slips through without friction.

Purely exemplarily, the freewheel device 68 is constructed out of a freewheel inner ring 70 that is non-rotatably mounted on the housing cover 11 by way of a bearing ring 69 of the housing cover 11, in particular a metallic freewheel inner ring, further in particular an aluminium or steel freewheel inner ring, a freewheel outer ring 71, in particular a metallic freewheel outer ring, further in particular a steel freewheel outer ring and a clamping ring device 72 arranged between the freewheel inner ring 70 and the freewheel outer ring 71, jamming or releasing the freewheel inner ring 70 with/from the freewheel outer ring 71 dependent on the direction of rotation.

The freewheel outer ring 71 of the freewheel device 68 is practically supported via the fourth rolling bearing arrangement 38 with respect to the centre axis 7 from radially inside on the housing pot 10 and further practically assigned mechanically to the planet carrier ring 64 of the second planetary gear 57 so that the freewheel outer ring 71 and the planet carrier ring 64 of the second planetary gear 57 can interact in a torque-transmitting manner. The said bearing ring 69 of the housing cover 11 is practically formed by a ring projection 116 arranged on the housing cover 11 which projects into the hub housing 9 and surrounds the centre axis 7 about the housing cover central opening 114, which ring projection 116, on an outer ring surface oriented with respect to the centre axis 7 radially to the outside, forms a first bearing seat 115 for the freewheel inner ring 70. The ring projection 116 can, on an inner ring surface which with respect to the centre axis 7 is oriented radially to the inside, have a second bearing seat 117 for the one rolling bearing 12b of the first rolling bearing arrangement 12.

In order to be able to produce the wheel hub drive 1, axially in the direction of the centre axis 7, in a relatively compact manner and relatively light in weight and to save costs with a minimum number of components, the invention proposes multiple constructional measures which can be realised individually alone or together in a wheel hub drive 1. According to FIGS. 1 to 13, all these measures are practically realised so that a particularly compact embodiment of the wheel hub drive 1 that is light in weight and cost-effective is provided. However, the invention practically includes also such embodiments of the wheel hub drive 1 which merely comprise one of these measures or multiple of these measures.

According to a first measure it is provided that the mechanical assignment of the sun gear 54 of the first planetary gear 48 to the drive hollow shaft 45 of the electric motor device 35 described above is constructionally solved in that the said sun gear 54 and the said drive hollow shaft 45 are realised as a monolithic unit, which in the following is referred to as sun gear drive hollow shaft assembly 73. In other words, the sun gear 54 of the first planetary gear 48 is embodied integrally with the drive hollow shaft 45 of the electric motor device 35. This results in a relatively compact and durable sun gear drive hollow shaft assembly 73 which can additionally be supported merely via the third rolling bearing arrangement 44, 44a, 44b on the central hollow shaft 13, as a result of which an additional bearing for the sun gear 54 of the first planetary gear 48 can be omitted. The sun gear drive hollow shaft assembly 73 can be optionally produced out of a metal material, a plastic material or a composite material.

According to a second measure it is provided that the three or more planet gear wheels 49 of the first planetary gear 48 and the three or more planet gear wheels 58 of the second planetary gear 57 are realised as common parts. In other words, the planet gear wheels 49, 58 employed in the two planetary gears 48, 57 are of identical design. Such common parts can be generally provided cost-effectively and in relatively large quantities. Further it can be provided that the planet gear wheels 49, 58 used in the wheel hub drive 1 are produced out of a plastic material or a composite material or a metal material. This has the advantage that compared with a metallic variant of the planet gear wheels 49, 58, which are likewise employed in the described wheel hub drive 1, are relatively light in weight. However, it can also be provided that the planet gear wheels 49 of the first planetary gear 48 and the planet gear wheels 58 of the second planetary gear 57 are realised as non-common parts in the manner that the planet gear wheels 49 of the first planetary gear 48 differ from those of the second planetary gear 57 in terms of construction or vice versa.

According to a third measure it is provided that the mechanical assignment of the sun gear 63 of the second planetary gear 57 to the planet carrier ring 55 of the first planetary gear 48 described above is constructionally solved in that the said planet carrier ring 55 and the said sun gear 63 form a monolithic unit, which in the following is referred to as planet carrier ring sun gear assembly 84, see FIGS. 1 to 3. In other words, the sun gear 63 of the second planetary gear 57 is embodied integrally with the planet carrier ring 55 of the first planetary gear 48. This results in a relatively compact and durable planet carrier ring sun gear assembly 84. Practically, the planet carrier ring sun gear assembly 84 can be produced out of a plastic material or a composite material, as a result of which the planet carrier ring sun gear assembly 84, compared with a metallic variant of the planet carrier ring sun gear assembly 84, which can likewise be employed in the described wheel hub drive 1, is relatively light in weight.

According to a fourth measure it is provided that the mechanical assignment of the freewheel outer ring 71 of the freewheel device 68 to the planet carrier ring 64 of the second planetary gear 57 described above is constructionally solved in that the said planet carrier ring 64 is positively arranged on the said freewheel outer ring 71, in particular moulded on. The said planet carrier ring 64 and the said freewheel outer ring 71 thus form a multi-part yet integral planet carrier ring freewheel assembly 90 that is permanently joined, wherein the freewheel outer ring 71, as explained above, can be produced out of a metal material, in particular out of an aluminium or steel material, and the said planet carrier ring 64 out of a plastic material or a composite material. Furthermore, it can be provided that the said planet carrier ring 64 instead on the said freewheel outer ring 71 is positively arranged on the freewheel inner ring 70 of the freewheel device 68, in particular moulded on, see FIG. 15. Basically it could also be provided that the said planet carrier ring 64 is positively arranged on the freewheel outer ring 71 and the freewheel inner ring 70, in particular moulded on.

Figure 8:
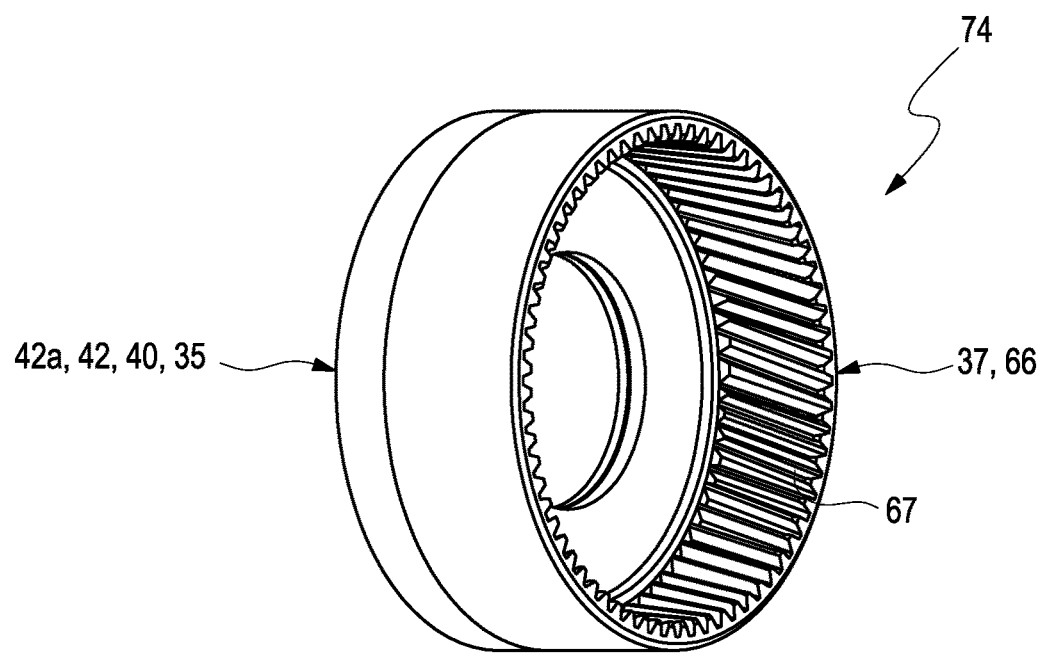
FIG. 8 shows, in a perspective view, a stator ring-internal gear assembly from FIG. 1 according to a preferred embodiment.
Figure 9:
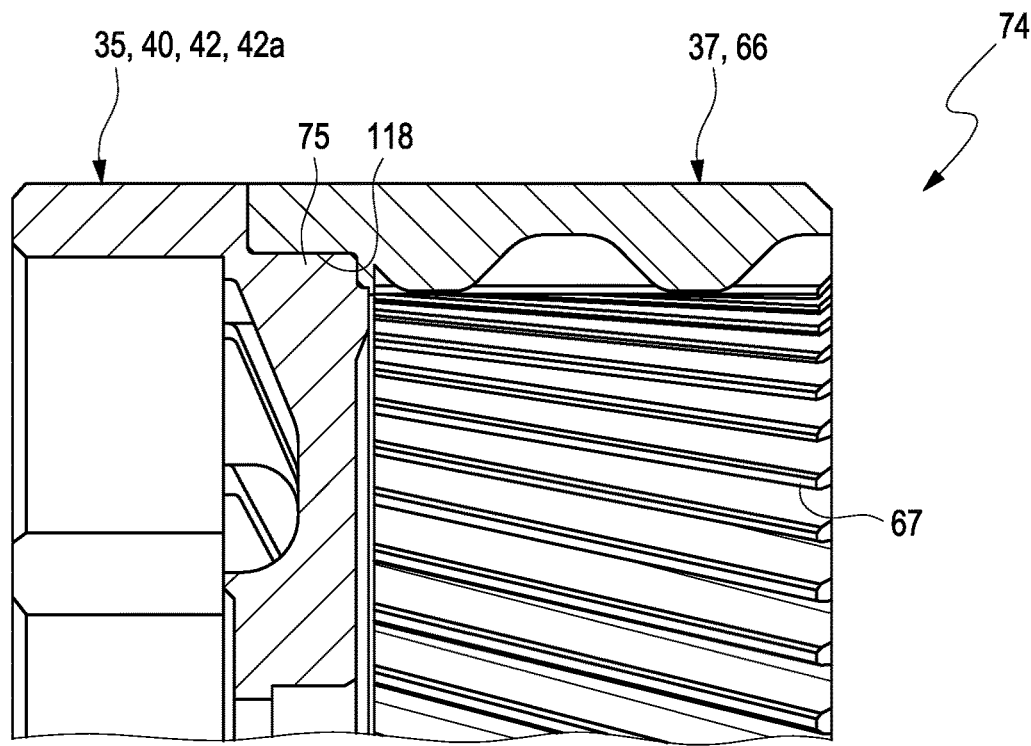
FIG. 9 shows a longitudinal section of the stator ring-internal gear assembly from FIG. 8.
Figure 10:
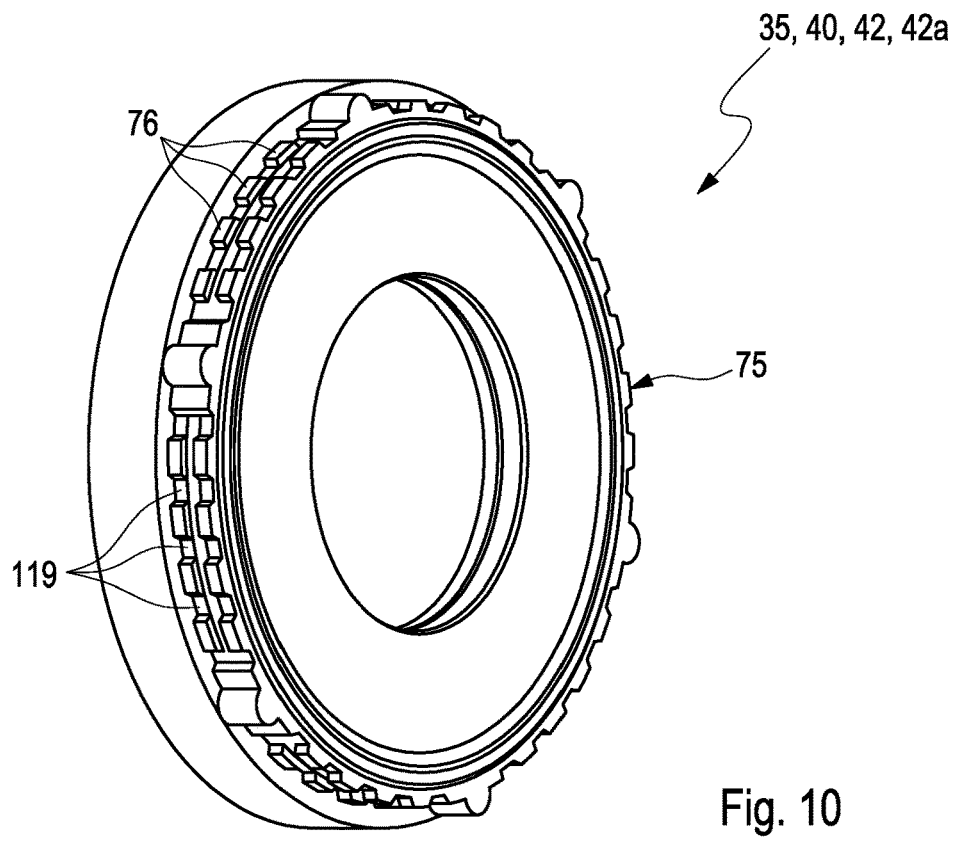
FIG. 10 shows, in a perspective view, a stator carrier of the electric motor device from FIG. 1 according to a preferred embodiment.
Figure 11:
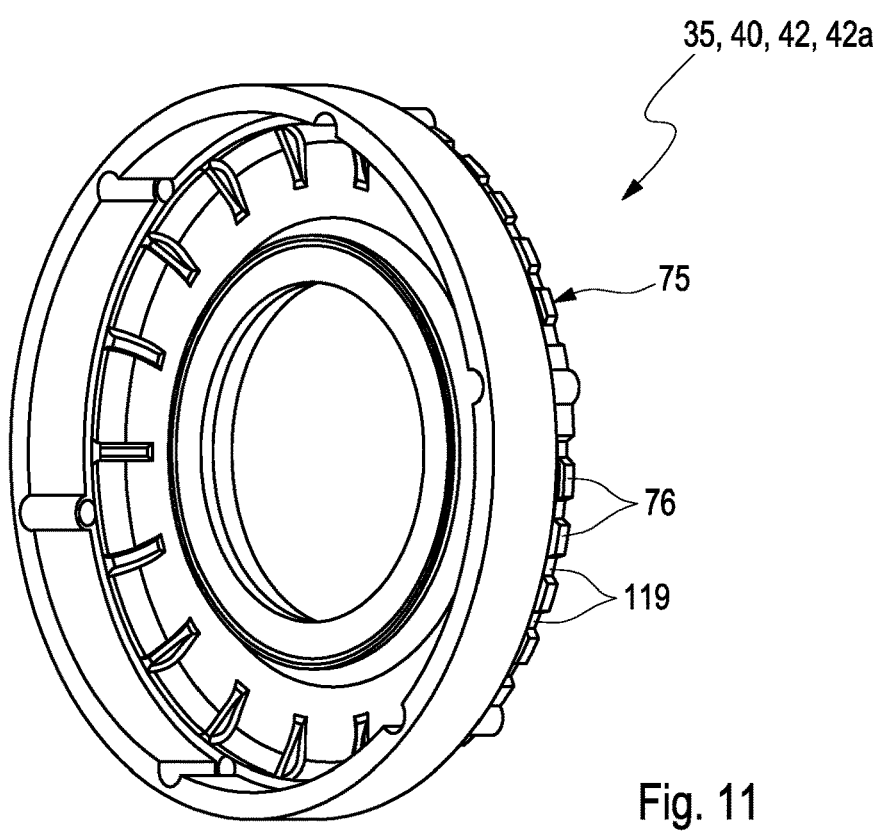
FIG. 11 shows, in a further perspective view, the stator carrier from FIG. 10.

According to a fifth measure it is provided that the internal gear 66 of the transmission device 37 described above is fixed on the stator ring 40 of the electric motor device 35, for example moulded on, see FIGS. 8 and 9. In particular it can be provided that the said internal gear 66 is arranged on a stator carrier portion of the stator ring 40 located radially outside, in particular on an edge region 118 of the stator ring 40. In FIG. 1 and FIGS. 8 and 9 it is noticeable that the internal gear 66 is exemplarily arranged on the stator carrier pot 42a of the stator carrier 42, it being fixed there in particular by moulding-on. Because of this, the internal gear 66 on the one hand is non-rotatably secured with respect to the stator ring 40 and the central hollow shaft 13 and also fixed axially with respect to the centre axis 7 on the stator ring 40, so that it cannot be axially removed from the stator ring 40. The said stator ring 42 and the said internal gear 66 practically form a multi-part yet permanently joined stator ring-internal gear assembly 74.

In order to improve in particular the torque transmission between the internal gear 66 and the stator ring 40 it can be provided that the stator ring 40 or the stator carrier 42, on its side facing the first planetary gear 48, has a circumferential edge toothing 75, which is quasi-over-moulded by the internal gear 66. Practically, the edge toothing 75 is subsequently worked into the stator carrier 42 mechanically or formed by primary moulding and/or formed by in particular wedge-shaped teeth 76 oriented with respect to the centre axis 7 radially to the outside with axial extent and gaps 119 between the teeth 76, see FIGS. 10 and 11. The edge toothings 75, in particular the teeth 76, can be formed with an undercut, which is likewise over-moulded by the internal gear 66, as a result of which it is even better protected axially on the stator carrier 42 against unintentional removal. Further practically, the stator carrier 42, as explained above, can be produced out of a metal material, in particular out of an aluminium or steel material, and the internal gear 66 out of a plastic material or a composite material.

Figure 12:
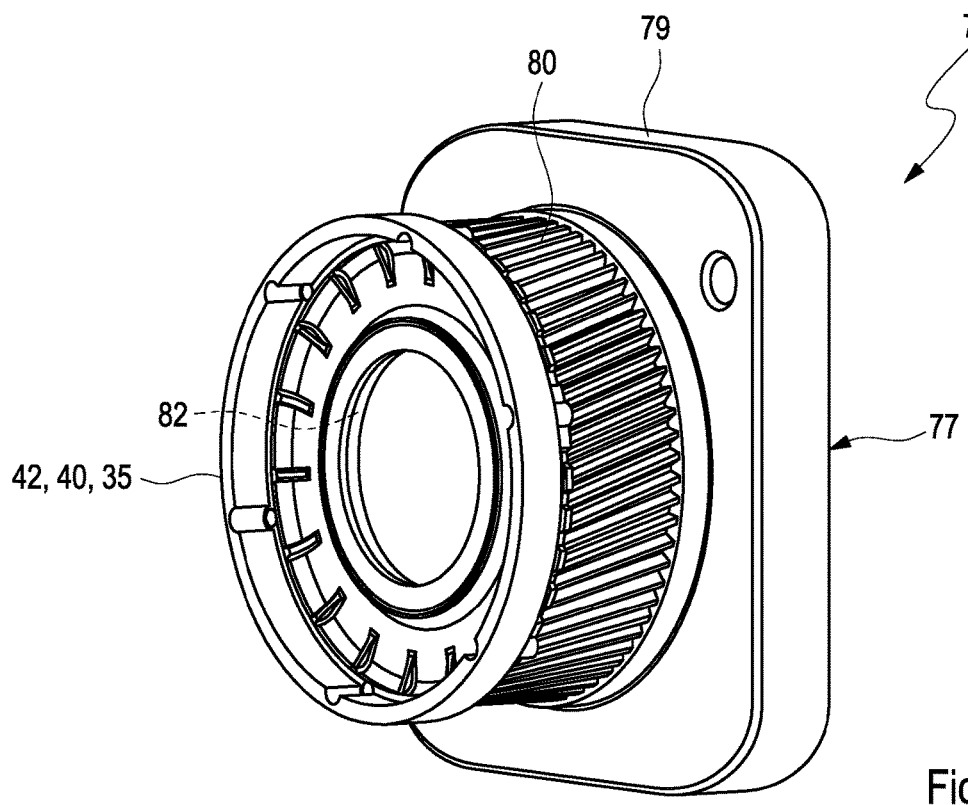
FIG. 12 shows, in a perspective view, an embodiment for a primary moulding tool for producing by plastic injection moulding the stator ring-internal gear assembly from FIGS. 8 and 9.
Figure 13:
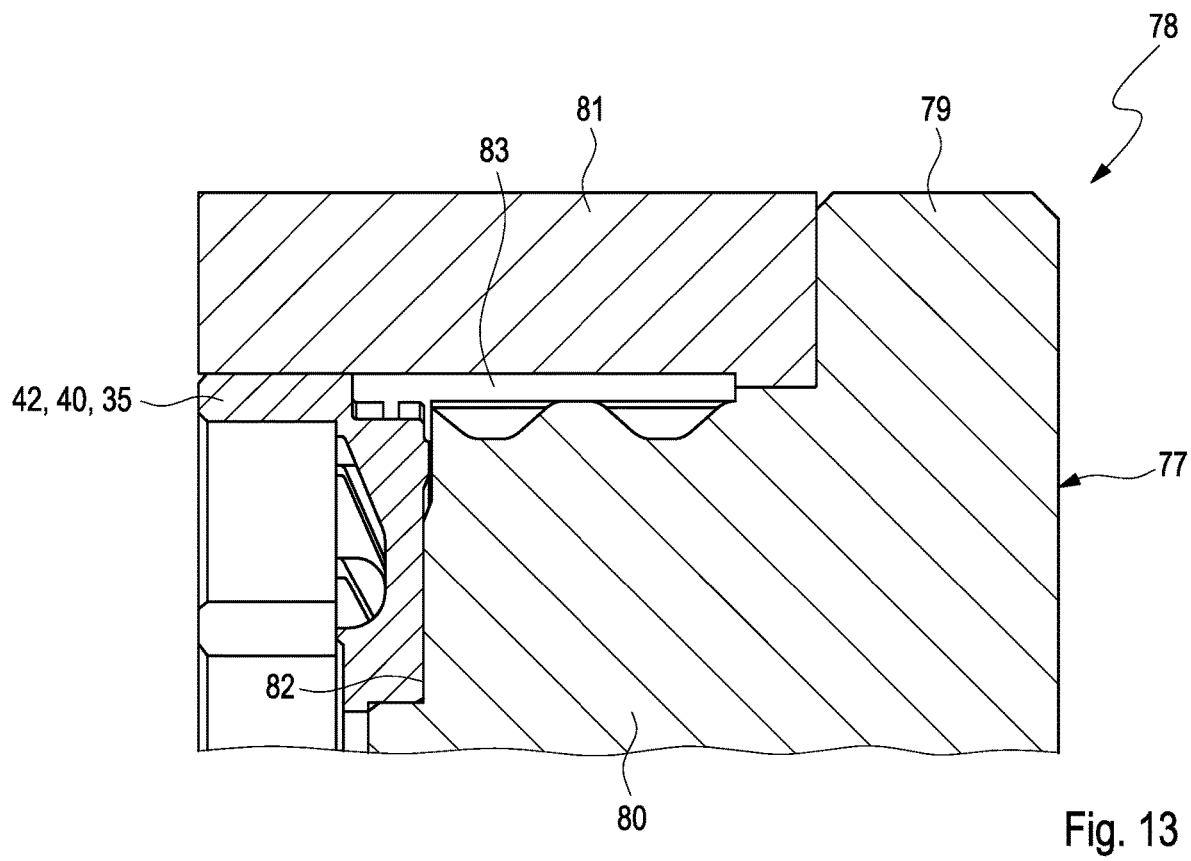
FIG. 13 shows a longitudinal section of the primary moulding tool from FIG. 12, FIGS. 14 to 17 show a further embodiment each of the wheel hub drive 1 in a longitudinal section.

FIGS. 12 and 13 show an embodiment for a primary moulding tool 77 for producing the said internal gear 66 by plastic injection moulding and a plastic injection moulding method 78 for producing the internal gear 66. Within the scope of the plastic injection moulding method 78, the said primary moulding tool 77 is initially provided, which in particular comprises a negative primary mould 80. The inner toothing 67 of the internal gear 66 and a further negative primary mould 81 for an outer contour of the internal gear 66 that can be plugged onto the holding base 79. Then, a prepared raw stator ring 40, or at least a prepared raw stator carrier 42 of the raw stator ring 40 is detachably attached to an annular holding portion 82 on the negative primary mould 80 prepared on the negative primary mould 80 for this purpose and then the further negative primary mould 81 arranged on the holding base 79, on the negative primary mould 80 and the raw stator ring 40 or the raw stator carrier 42 so that between the negative primary mould 80, the further negative primary mould 81 and the stator ring 40 or the stator carrier 42 an annular cavity 83 defining the contour of the internal gear 66 is formed. The same can subsequently be completely filled out with injection-mouldable plastic material via a feeder channel for plastic material arranged in the primary mould 77 which is not illustrated here. Following the hardening of the injected material, the negative primary mould 80 and the further negative primary mould 81 can be removed, as a result of which a multi-part yet permanently joined stator ring-internal gear assembly 74 consisting of a stator ring 40 or a stator carrier 42 and an internal gear 66 is provided.

Figure 2:
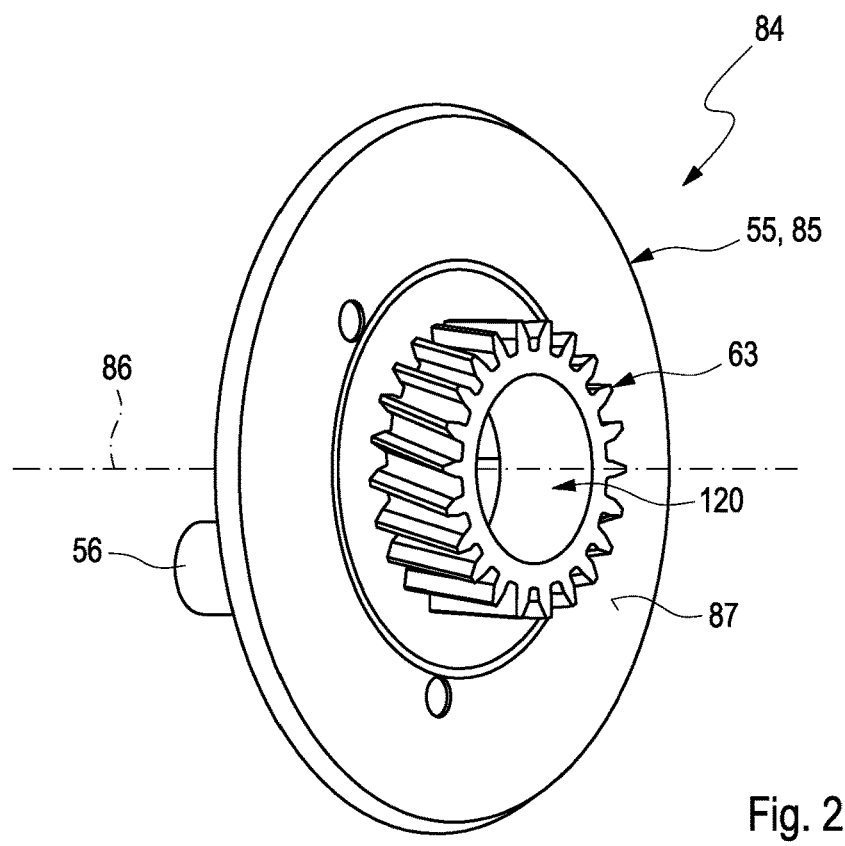
FIG. 2 shows, in a perspective view, a planet carrier ring sun gear assembly from FIG. 1 according to a preferred embodiment.

FIGS. 2 and 3 show the said planet carrier ring sun gear assembly 84 of the wheel hub drive 1 from FIG. 1, each in a perspective view. In FIG. 2, the planet carrier ring sun gear assembly 84 is illustrated with a view of its sun gear 63 and its planet carrier ring 55. The planet carrier ring 55 is exemplarily realised by a circular single-flange or single-walled basic ring disc body 85, which defines a planet carrier ring centre axis 86, which in the assembled state of the wheel hub drive 1 is oriented coaxially to the centre axis 7. The basic ring disc body 85, furthermore, is configured symmetrically with respect to the planet carrier ring centre axis 86 and has a central opening 120 and two large annular surfaces oriented with respect to the planet carrier ring centre axis 86 opposite to one another. The said sun gear 63 is now oriented coaxially to the planet carrier ring centre axis 86 and on the front side arranged on one of the two large annular surfaces of the basic ring disc body 85 in the following referred to as sun gear mounting surface 87 and integrally connected to the same. FIG. 3 shows the planet carrier ring sun gear assembly 84 now looking at the large annular surface of the basic ring disc body 85 oriented opposite with respect to the sun gear mounting surface 87, which in the following is referred to as planet carrier mounting surface 88. It is noticeable that the above mentioned support pins 56 of the planet carrier ring 55 for supporting the planet gear wheels 49 are arranged on the planet carrier mounting surface 88 located evenly distributed on a circular path about the planet carrier ring centre axis 86 and embodied integrally with the basic ring disc body 85 of the planet carrier ring 55. The term "evenly" practically means that the support pins 56 are each equidistant from one another in a circumferential direction which is not drawn in in FIGS. 2 and 3 round about the planet carrier ring centre axis 86. In FIG. 3 it is noticeable, furthermore, that the planet carrier ring sun gear assembly 84 comprises three axial bearing arms 89, which are arranged on the planet carrier mounting surface 88 located evenly distributed on a circular path about the planet carrier ring centre axis 86 and integrally moulded onto the basic ring disc body 85, just like the said support pins 56. Here, the term "evenly" likewise means practically that the axial bearing arms 89 are each equidistant from one another in the said circumferential direction round about the planet carrier ring centre axis 86 which is not drawn in. Exemplarily, the axial bearing arms 89 stand perpendicularly on the planet carrier mounting surface 88 and/or are produced out of a plastic material or a composite material, just like the basic ring disc body 85 and the support pins 56. The axial bearing arms 89 are exemplarily formed by a annular segment body 123 each, which with their concave sides are oriented in the direction of the planet carrier ring centre axis 86. The axial bearing arms 89, furthermore, are each exemplarily arranged between two support pins 56, in particular so that in the said circumferential direction round about the planet carrier ring centre axis 86 which is not drawn in, support pins 56 and axial bearing arms 89 are alternatingly arranged. Between the support pins 56 and the axial bearing arms 89, an identical circumferential distance can always be adjusted in the said circumferential direction round about the planet carrier ring centre axis 86 which is not drawn in, as a result of which adjacent support pins 56 and axial bearing arms 89 are equidistant from one another. In the assembled state of the wheel hub drive 1, the axial bearing arms 89 of the planet carrier ring sun gear assembly 84 are axially and/or radially supported on the stator ring 40 of the electric motor device 35, in particular on the stator carrier 42 of the stator ring 40, as a result of which an advantageous mounting of the planet carrier ring sun gear assembly 84 on the stator ring 40 is stated. In particular, the axial bearing arms 89 can be mounted on the stator ring 40 by way of a fifth rolling bearing arrangement 121, which is exemplarily realised by a commercially available simple ball rolling bearing 121a.

FIGS. 4 to 7 show the planet carrier ring-freewheel assembly 90 described above, which is assembled out of the freewheel outer ring 71 of the freewheel device 68 and out of the planet carrier ring 64 of the second planetary gear 57.

Figure 4:
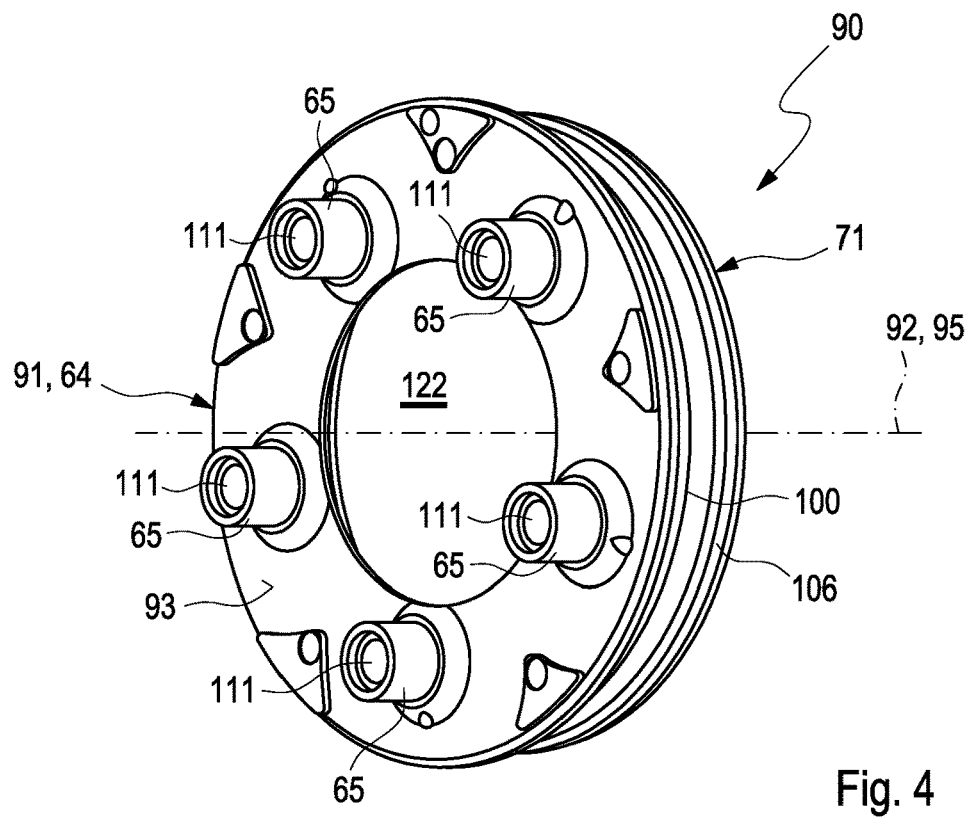
FIG. 4 shows, in a perspective view, a planet carrier ring-freewheel assembly from FIG. 1 according to a preferred embodiment.

In FIG. 4, the planet carrier ring-freewheel assembly 90 is initially illustrated looking at the said planet carrier ring 64, the freewheel outer ring 71 is only noticeable in portions. The said planet carrier ring 64 is exemplarily realised by a circular, single-flange or single-walled basic ring disc body 91, which defines a planet carrier ring centre axis 92, which in the assembled state of the wheel hub drive 1 is arranged coaxially with the centre axis 7. The basic ring disc body 91 of the said planet carrier ring 64, with respect to the planet carrier ring centre axis 92, is configured symmetrically and equipped with a central opening 122 and two large annular surfaces oriented with respect to the planet carrier ring centre axis 92 opposite one another, wherein the large annular surface visible in FIG. 4 is referred to as planet carrier mounting surface 93 in the following. It is noticeable that the support pins 65 of the said planet carrier ring 64 mentioned above, for supporting the planet gear wheels 58 of the second planetary gear 57 on the carrier mounting surface 93 are arranged located evenly distributed on a circular path about the planet carrier ring centre axis 92 and are embodied integrally with the basic ring disc body 91 of the planet carrier ring 64. Here, the term "evenly" practically also means that the support pins 65 are each arranged equidistant from one another in a circumferential direction round about the planet carrier ring centre axis 92 which is not drawn in in FIGS. 4 and 5. Adjacent support pins 65 are therefore equidistant from one another.

Figure 5:
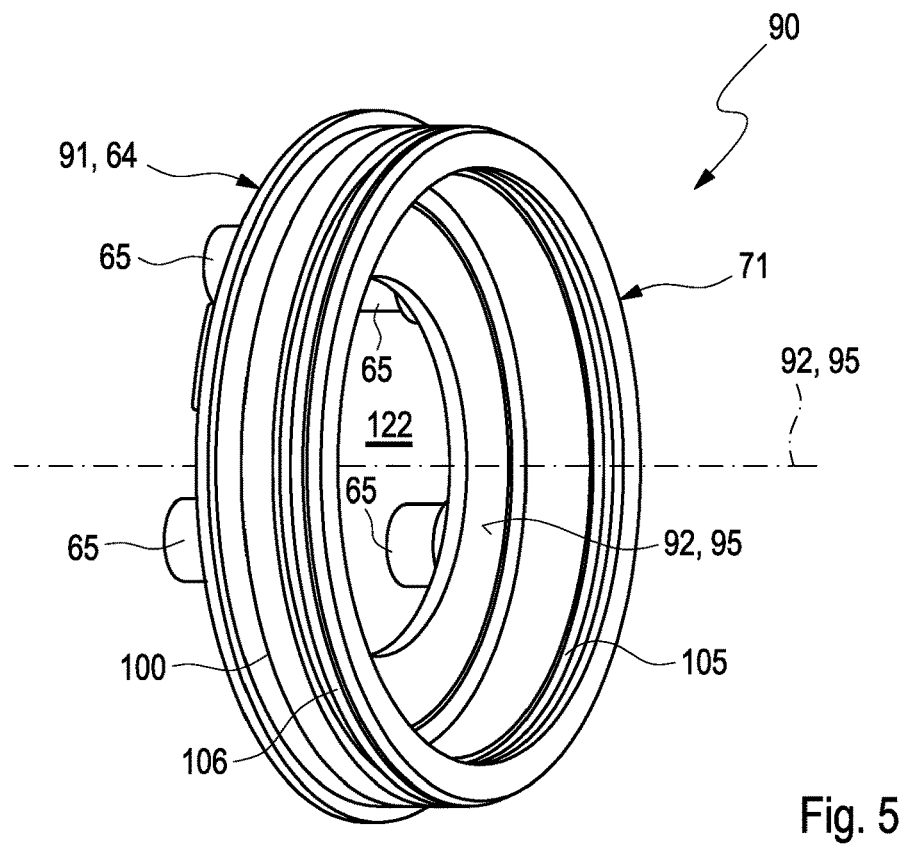
FIG. 5 shows, in a further perspective view, the planet carrier ring-freewheel assembly from FIGS. 1 and 4.

In FIG. 5, the planet carrier ring-freewheel assembly 90 is illustrated looking at the said freewheel outer ring 71, instead the planet carrier ring 64 is now only noticeable in portions. The said freewheel outer ring 71 is exemplarily realised by a circular ring-shaped body, which has a substantially rectangular cross-section and defines a freewheel outer ring centre axis 95, which in the assembled state of the wheel hub drive 1 coaxially coincides with the centre axis 7 and in the assembled state of the planet carrier ring-freewheel assembly 90 with the planet carrier ring centre axis 92. The freewheel outer ring 71, viewed with respect to the freewheel outer ring centre axis 95, has two axial end ring portions 96, 97 oriented opposite to one another, which via a central planet carrier ring portion 98 of the freewheel outer ring 71 are integrally connected to one another. With respect to the freewheel outer ring centre axis 95, the freewheel outer ring 71 is practically configured symmetrically.

In order to be able to permanently join the planet carrier ring 64 of the second planetary gear 57 to the freewheel outer ring 71, it is provided that the freewheel outer ring 71 is touchingly arranged with one of its two axial end ring portions 96 on the large annular surface of the basic ring disc body 91 of the planet carrier ring 64 oriented opposite with respect to the planet carrier mounting surface 93, which in the following is referred to as freewheel outer ring mounting surface 99 and positively joined to the said basic ring disc body 91 in a positive connection region 100. Practically, the basic ring disc body 91 of the planet carrier ring 64 is moulded onto this axial end ring portion 96 in the positive connection region 100. In order to be able to realise an optimal torque transmission between the planet carrier ring 64 and the freewheel outer ring 71, a toothing can be provided in the positive connection region 100 on the basic ring disc body 91 and/or the freewheel outer ring 71. According to FIGS. 6 and 7, such a toothing is exemplarily realised in the positive connection region 100 by a circumferential edge toothing 101 on the freewheel outer ring 71. This toothing can be subsequently worked in mechanically in an edge region of the body of the freewheel outer ring 71, preferentially in an edge region of the axial end ring portion 64 facing the planet carrier ring 64 or be formed by primary moulding and/or be formed by in particular wedge-shaped teeth 102 and gaps 125 oriented with respect to the freewheel outer ring centre axis 95 radially to the outside. The planet carrier ring-freewheel assembly 90 can, in the said positive connection region 100, additionally comprise an undercut 103 in order to realise an axial positive connection, so that the freewheel outer ring 71 cannot be removed from the planet carrier ring 64 in the axial direction. For this purpose, it can be practically provided that the freewheel outer ring 71, in its axial end ring portion 96 facing the planet carrier ring 64 in the positive connection region 100 comprises a circumferential groove 104 forming an undercut, wherein the basic ring disc body 91 of the planet carrier ring 64 is injected or moulded into this groove 104.

Figure 6:
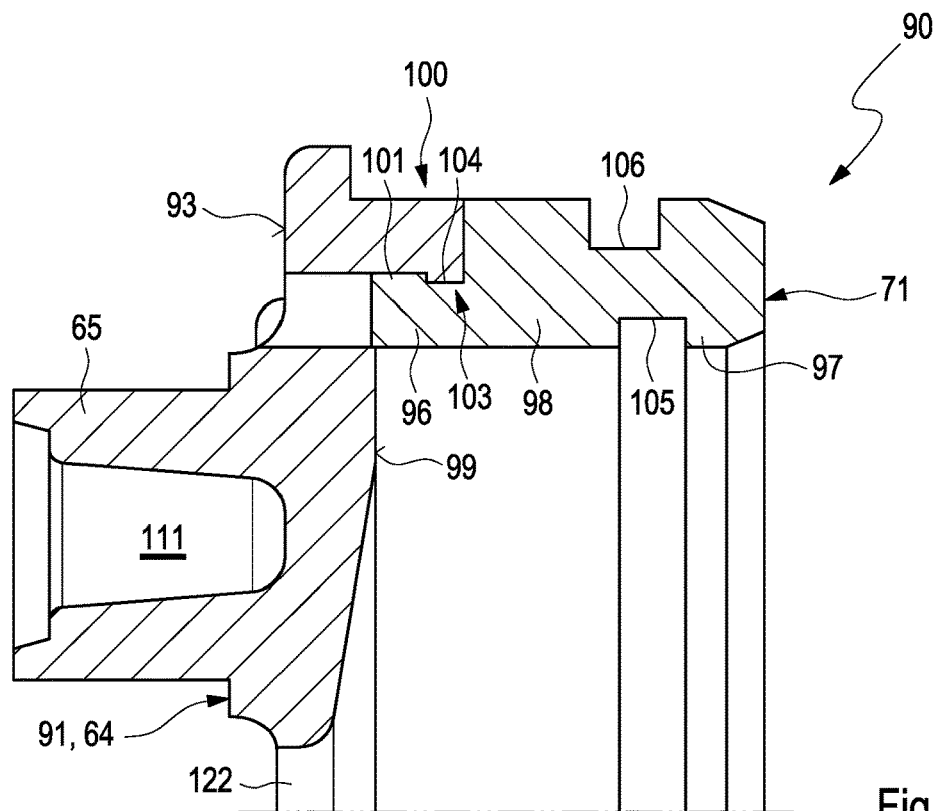
FIG. 6 shows a longitudinal section of the planet carrier ring-freewheel assembly from FIGS. 1, 4 and 5.
Figure 7:
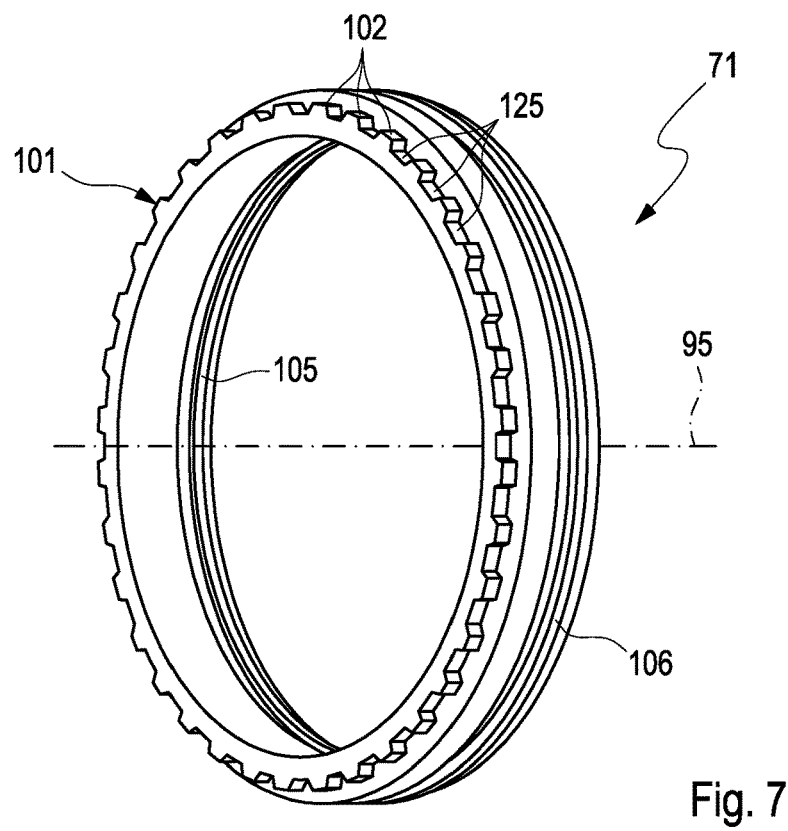
FIG. 7 shows, in a perspective view, a freewheel outer ring of the planet carrier ring-freewheel assembly from FIGS. 1, 4 to 6 according to a preferred embodiment.

In particular in FIG. 6 it is visible that the planet carrier ring portion 98 of the freewheel outer ring 71 and/or the axial end ring portion 97 of the freewheel outer ring 71 not arranged in the positive connection region 100, i.e. that axial end ring portion 97 of the freewheel outer ring 71, which with respect to the axial end ring portion 96 arranged in the positive connection region 100 is oriented opposite, can comprise a circumferential locking ring inner groove 105 oriented with respect to the freewheel outer ring centre axis 95 radially to the inside for a first locking ring 109 for axially locking the freewheel device 98 and a circumferential locking ring outer groove 106 oriented with respect to the freewheel outer ring centre axis 95 radially to the outside for a second locking ring 112 for axially locking the fourth rolling bearing arrangement 38. In FIG. 6 it is also visible that each support pin 65, for saving material and weight, can have a cup-shaped axial recess 111.

Figure 14:
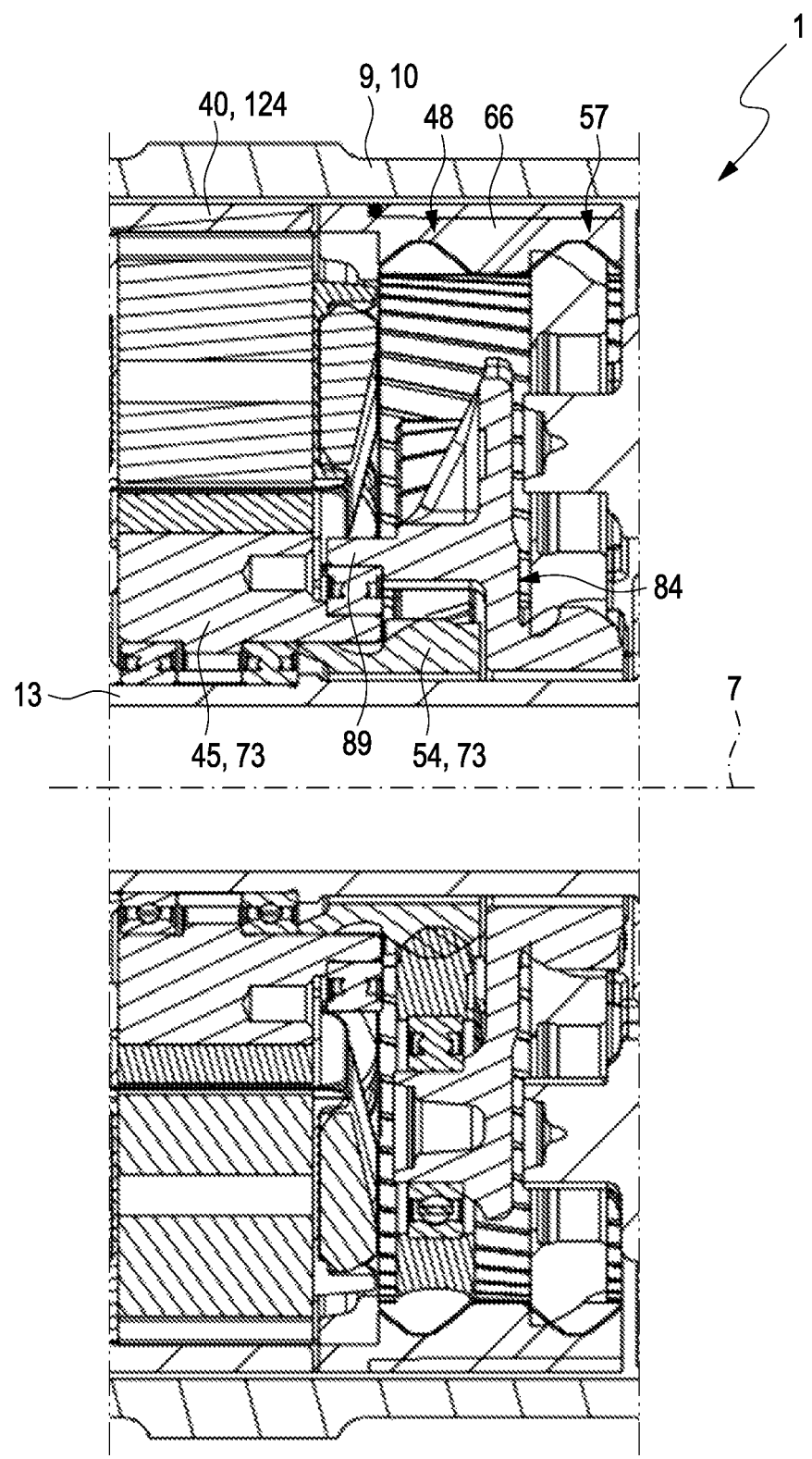

In FIG. 14, a further embodiment of the wheel hub drive 1 is shown in a longitudinal section. In contrast with the previously described embodiment of the wheel hub drive 1, the sun gear 54 of the first planetary gear 48 and the drive hollow shaft 45 of the electric motor device 35 are not embodied integrally here, but as separate components, which are positively joined to one another for example by pressing. The sun gear 54 and the drive hollow shaft 45 thus form a multi-part yet integral sun gear drive hollow shaft assembly 73. Furthermore, the embodiment of the wheel hub drive 1 according to FIG. 14 differs from the preceding embodiment in that in the assembled state of the wheel hub drive 1 the axial bearing arms 89 of the planet carrier ring sun gear assembly 84 are no longer axially and/or radially supported on the stator ring 40 of the electric motor device 35 or on the stator carrier 42 of the stator ring 40, but now on the drive hollow shaft 45 of the electric motor device 35 and in that the stator ring 40 is produced by a cylinder ring body 124 out of a metal material, in particular out of an aluminium material or a steel material, a plastic material or a composite material.

Figure 15:
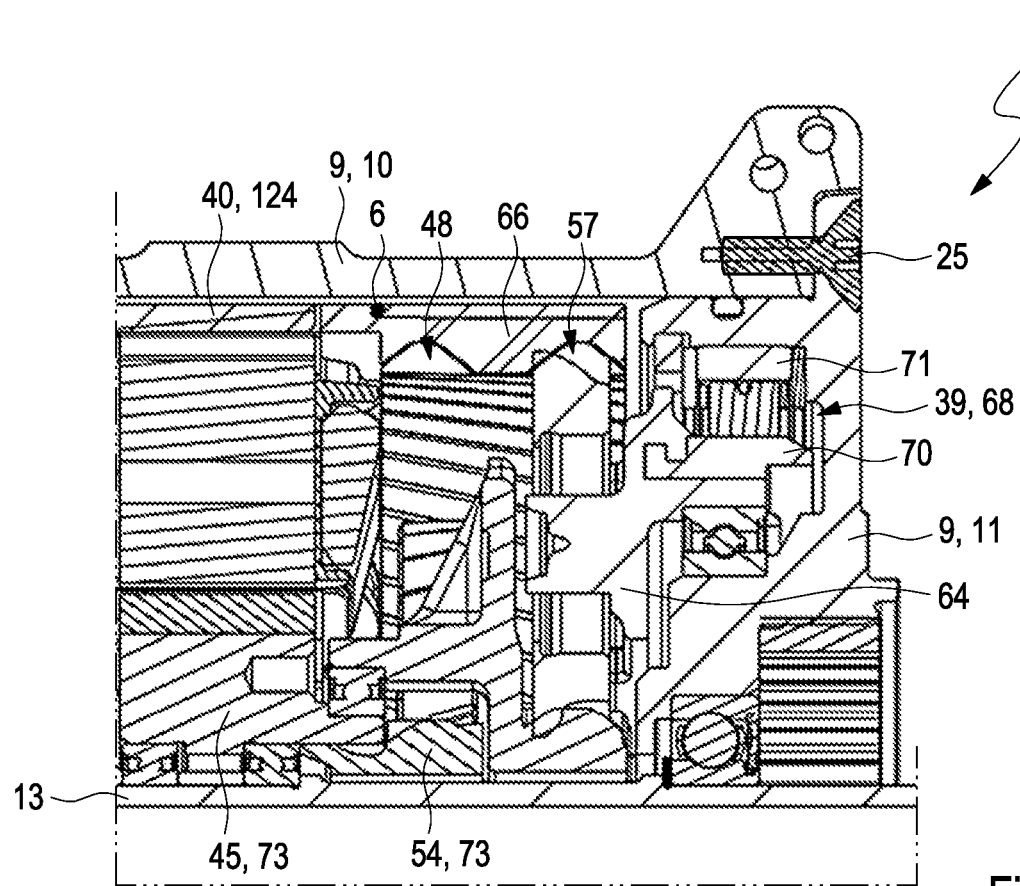

FIG. 15 shows a further embodiment of the wheel hub drive 1 in a longitudinal section. In contrast with the previously described embodiments of the wheel hub drive 1, the planet carrier ring-freewheel assembly 90 here is realised in that the said planet carrier ring 64 is positively arranged on the freewheel inner ring 70 of the freewheel device 68 instead of the said freewheel outer ring 71, in particular moulded on. Further, the freewheel device 68 is supported on the housing cover 11 via its freewheel outer ring 71 instead of via its freewheel inner ring 70. The stator ring 40 is likewise formed by a cylinder ring body 124, which is produced out of a metal material, in particular out of an aluminium material or a steel material, a plastic material or a composite material. A locking ring is indicated with reference number 6.

Figure 16:
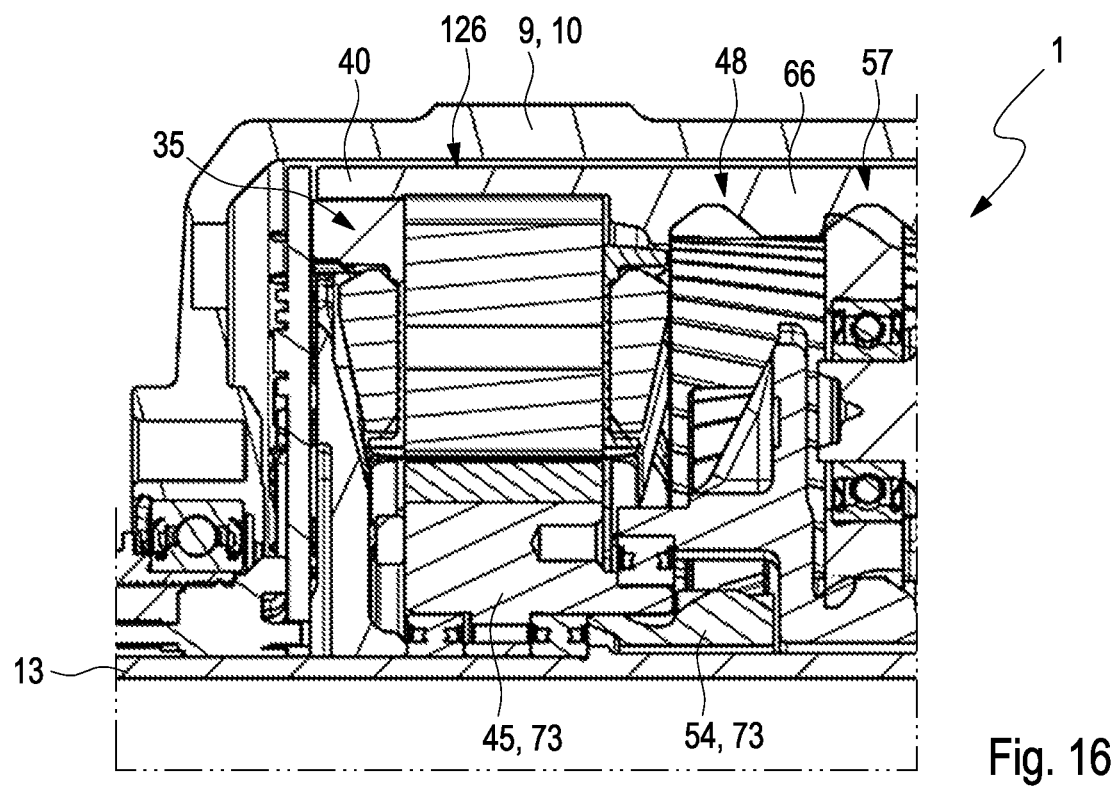
Figure 17:
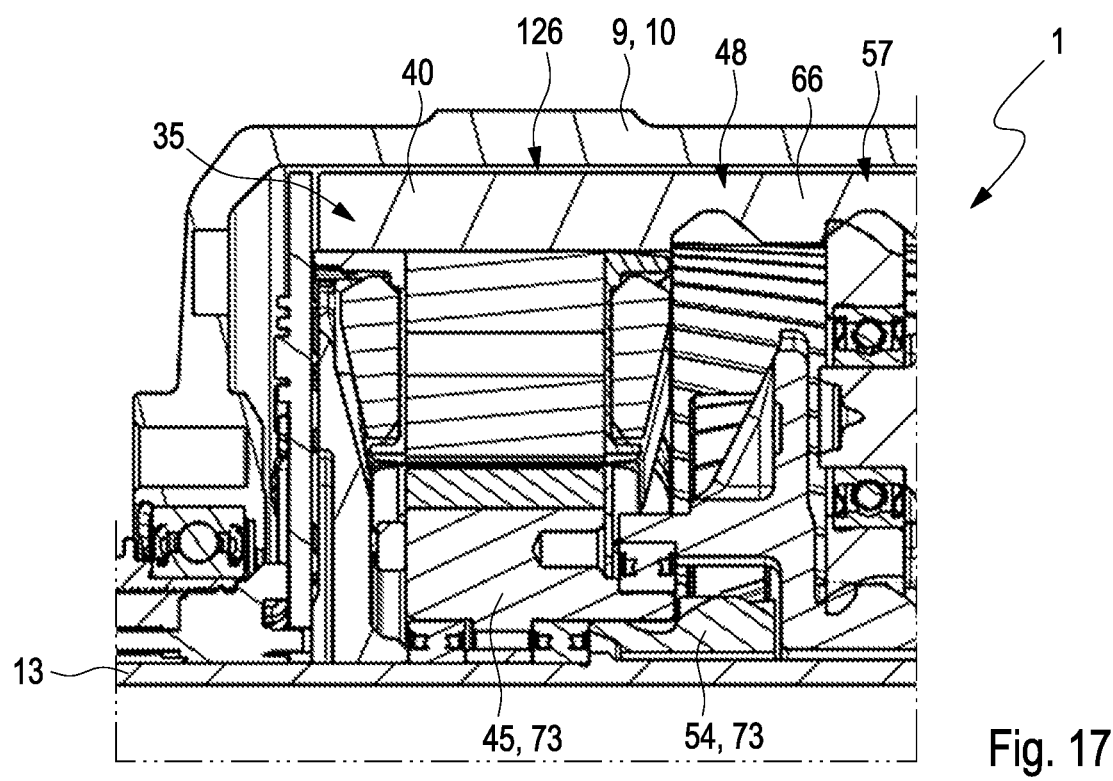

FIGS. 16 and 17 show further embodiments of the wheel hub drive 1 in a longitudinal section. In contrast with the previously described embodiments of the wheel hub drive 1 it is provided here that the said stator ring 40 and the said internal gear 66 form an assembly 126, in that the stator ring 40 is axially extended so that the internal gear 66 can be directly mounted, for example it can be pushed in or integrally moulded. The assembly 126 can for example also be embodied as monolithic unit 126 in that the said stator ring 40 and the said internal gear 66 are realised integrally. Practically, the monolithic unit 126 can be produced out of a plastic material.

The invention claimed is:

1. A planet carrier ring sun gear assembly for a transmission device with at least two planetary gears of a wheel hub drive for a vehicle, the planet carrier ring sun gear assembly comprising:
    a planet carrier ring of a first planetary gear, the planet carrier ring configured to support a plurality of planet gear wheels of the first planetary gear and a sun gear of a second planetary gear; and
    a plurality of axial bearing arms arranged on the planet carrier ring opposite the sun gear, the plurality of axial bearing arms configured to at least one of axially and radially support the planet carrier ring sun gear assembly on a stator ring of an electric motor device of the wheel hub drive;
    wherein the planet carrier ring and the sun gear form a monolithic unit.

2. The planet carrier ring sun gear assembly according to claim 1, wherein:
    the planet carrier ring is formed by a basic ring disc body;
    the basic ring disc body is at least one of a single-flange basic ring disc body and a single-walled basic ring disc body; and
    the basic ring disc body defines a planet carrier ring centre axis.

3. The planet carrier ring sun gear assembly according to claim 2, wherein:
    the basic ring disc body has an annular sun gear mounting surface;
    the sun gear is arranged on the sun gear mounting surface and is oriented coaxial with the planet carrier ring centre axis; and
    the sun gear is integrally connected to the sun gear mounting surface.

4. The planet carrier ring sun gear assembly according to claim 1, wherein:
    the plurality of axial bearing arms are arranged on an annular planet carrier mounting surface of a basic ring disc body of the planet carrier ring;
    the basic ring disc body is at least one of a single-flange basic ring disc body and a single-walled basic ring disc body; and
    the plurality of axial bearing arms are structured integrally with the basic ring disc body.

5. The planet carrier ring sun gear assembly according to claim 4, wherein the plurality of axial bearing arms includes exactly three axial bearing arms that are arranged on the planet carrier mounting surface evenly distributed about a planet carrier ring centre axis defined by the basic ring disc body.

6. The planet carrier ring sun gear assembly according to claim 4, wherein the plurality of axial bearing arms extend perpendicularly from the planet carrier mounting surface.

7. The planet carrier ring sun gear assembly according to claim 4, wherein the plurality of axial bearing arms are each structured as an annular segment body having a concave side facing toward a planet carrier ring centre axis defined by the basic ring disc body.

8. The planet carrier ring sun gear assembly according to claim 1, further comprising a plurality of support pins arranged on the planet carrier ring opposite the sun gear, wherein the plurality of support pins are configured to support the plurality of planet gear wheels of the first planetary gear.

9. The planet carrier ring sun gear assembly according to claim 8, wherein the plurality of support pins includes exactly three support pins that are arranged on a planet carrier mounting surface of a basic ring disc body of the planet carrier ring and evenly distributed on a circular path extending about a planet carrier ring centre axis defined by the basic ring disc body.

10. The planet carrier ring sun gear assembly according to claim 8, wherein:
    the plurality of support pins are arranged on an annular planet carrier mounting surface of a basic ring disc body of the planet carrier ring;

the basic ring disc body is at least one of a single-flange basic ring disc body and a single-walled basic ring disc body; and the plurality of support pins are structured integrally with the basic ring disc body.

11. The planet carrier ring sun gear assembly according to claim 8, wherein an angle of 45° to 180° is defined between adjacent support pins of the plurality of support pins, the adjacent support pins disposed adjacent to one another in a circumferential direction extending about a planet carrier ring centre axis defined by a basic ring disc body of the planet carrier ring.

12. The planet carrier ring sun gear assembly according to claim 11, wherein the angle defined between the adjacent support pins is 120°.

13. The planet carrier ring sun gear assembly according to claim 1, further comprising a plurality of support pins configured to support the plurality of planet gear wheels of the first planetary gear, wherein the plurality of support pins and the plurality of axial bearing arms are arranged on the planet carrier ring in an alternating manner in a circumferential direction extending about a planet carrier ring centre axis defined by a basic ring disc body of the planet carrier ring.

14. The planet carrier ring sun gear assembly according to claim 13, wherein at least one of the plurality of axial bearing arms, the basic ring disc body, the plurality of support pins, and the sun gear is composed of at least one of a plastic material and a composite material.

15. The planet carrier ring sun gear assembly according to claim 1, wherein an angle of 45° to 180° is defined between adjacent axial arms of the plurality of axial bearing arms, the adjacent axial arms disposed adjacent to one another in a circumferential direction extending about a planet carrier ring centre axis defined by a basic ring disc body of the planet carrier ring.

16. The planet carrier ring sun gear assembly according to claim 15, wherein the angle defined between the adjacent axial arms is 120°.

17. A wheel hub drive of a vehicle, comprising:
a centre axis;
a central hollow shaft arranged coaxial with the centre axis;
a hub housing including a pot-shaped monolithic housing pot and a monolithic housing cover, the hub housing rotatably adjustably mounted on the central hollow shaft;
a drive unit including (i) an electrically operated electric motor configured to provide a motor torque, (ii) a transmission configured to translate the motor torque into a net torque, and (iii) a coupling mechanism configured to transmit the net torque to the housing cover;
wherein the electric motor, the transmission, and the coupling mechanism are housed in the hub housing;
wherein the transmission includes at least two planetary gears and at least one planet carrier ring sun gear assembly;
wherein the at least two planetary gears includes a first planetary gear and a second planetary gear;
wherein the at least one planet carrier ring sun gear assembly includes:
a planet carrier ring of the first planetary gear, the planet carrier ring configured to support a plurality of planet gear wheels of the first planetary gear and a sun gear of the second planetary gear; and
a plurality of axial bearing arms arranged on the planet carrier ring opposite the sun gear, the plurality of axial bearing arms configured to at least one of axially and radially support the planet carrier ring sun gear assembly on a stator ring of the electric motor; and
wherein the planet carrier ring and the sun gear form a monolithic unit.

18. The wheel hub drive according to claim 17, wherein the electric motor, the transmission, and the coupling mechanism are arranged coaxially with respect to the centre axis.

19. A vehicle, comprising:
a wheel including a wheel hub;
at least one wheel hub drive installed in a region of the wheel hub of the wheel; and
a muscle power-operated pedal mechanism interacting with the wheel hub drive via a transmission gear;
wherein the at least one wheel hub drive includes:
a centre axis;
a central hollow shaft arranged coaxial with the centre axis;
a hub housing including a pot-shaped monolithic housing pot and a monolithic housing cover, the hub housing rotatably adjustably mounted on the central hollow shaft; and
a drive unit including (i) an electrically operated electric motor configured to provide a motor torque, (ii) a transmission configured to translate the motor torque into a net torque, and (iii) a coupling mechanism configured to transmit the net torque to the housing cover;
wherein the electric motor, the transmission, and the coupling mechanism are housed in the hub housing;
wherein the transmission includes at least two planetary gears and at least one planet carrier ring sun gear assembly;
wherein the at least two planetary gears includes a first planetary gear and a second planetary gear;
wherein the at least one planet carrier ring sun gear assembly includes:
a planet carrier ring of the first planetary gear, the planet carrier ring configured to support a plurality of planet gear wheels of the first planetary gear and a sun gear of the second planetary gear; and
a plurality of axial bearing arms arranged on the planet carrier ring opposite the sun gear, the plurality of axial bearing arms configured to at least one of axially and radially support the planet carrier ring sun gear assembly on a stator ring of the electric motor; and
wherein the planet carrier ring and the sun gear form a monolithic unit.

\* \* \* \* \*